United States Patent
Chang et al.

(10) Patent No.: US 9,378,400 B2
(45) Date of Patent: Jun. 28, 2016

(54) RADIO-FREQUENCY IDENTIFICATION READER DEVICE

(71) Applicant: Wistron NeWeb Corp., Hsinchu (TW)

(72) Inventors: Chung-Ping Chang, Hsinchu (TW); Chia-Chang Liu, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 22 days.

(21) Appl. No.: 14/536,688

(22) Filed: Nov. 10, 2014

(65) Prior Publication Data
US 2015/0371065 A1  Dec. 24, 2015

(30) Foreign Application Priority Data
Jun. 23, 2014  (TW) .............................. 103121553 A

(51) Int. Cl.
*G06K 7/10* (2006.01)
(52) U.S. Cl.
CPC ........ *G06K 7/10009* (2013.01); *G06K 7/10356* (2013.01)
(58) Field of Classification Search
CPC .......... G06K 7/10366; G06K 7/10009; G06K 19/0723; G06K 7/10316; G06K 7/10356; G06K 7/008; G06K 7/10128
USPC ....................................... 340/10.1
See application file for complete search history.

(56) References Cited

U.S. PATENT DOCUMENTS

| | | | |
|---|---|---|---|
| 6,353,406 B1* | 3/2002 | Lanzl ................... | G01S 13/84 340/10.1 |
| 6,812,824 B1* | 11/2004 | Goldinger ............. | G06K 17/00 340/10.1 |
| 8,204,438 B2* | 6/2012 | Patel .................... | G01S 5/04 340/10.1 |
| 8,446,256 B2* | 5/2013 | Pinkham .............. | G06K 7/0008 340/10.1 |
| 2005/0110674 A1* | 5/2005 | Mendolia .............. | G01S 5/04 342/81 |
| 2008/0084310 A1* | 4/2008 | Nikitin ................. | G06K 7/0008 340/572.7 |
| 2009/0009296 A1* | 1/2009 | Shafer .................. | G06K 7/10356 340/10.1 |
| 2009/0027202 A1* | 1/2009 | Copeland .............. | H01Q 21/28 340/572.1 |
| 2009/0091454 A1* | 4/2009 | Tuttle ................... | G01S 11/10 340/572.7 |
| 2009/0096612 A1* | 4/2009 | Seppa ................... | H01Q 9/0421 340/572.7 |

FOREIGN PATENT DOCUMENTS

| | | |
|---|---|---|
| CN | 101416200 | 3/2013 |
| CN | 101048786 | 12/2013 |
| TW | 200620743 | 6/2006 |
| TW | 201246816 | 11/2012 |

OTHER PUBLICATIONS

"Office Action of Taiwan Counterpart Application", issued on Oct. 8, 2015, p. 1-p. 9, in which the listed references were cited.

* cited by examiner

*Primary Examiner* — Mark Blouin
(74) *Attorney, Agent, or Firm* — Jianq Chyun IP Office

(57) ABSTRACT

A radio-frequency identification reader device including a plurality of antennas, a switch module, a coaxial cable, and a reader is provided. The switch module is electrically connected to the antennas. The coaxial cable is electrically connected to the switch module. The reader transmits a DC voltage, a control signal, and a radio-frequency signal to the switch module through the coaxial cable. The switch module generates an operation voltage by the DC voltage and the control signal. The switch module selects one of the antennas as a preset antenna by the control signal and drives the preset antenna by the radio-frequency signal.

9 Claims, 4 Drawing Sheets

RADIO-FREQUENCY IDENTIFICATION READER DEVICE

CROSS-REFERENCE TO RELATED APPLICATION

This application claims the priority benefit of Taiwan application serial no. 103121553, filed on Jun. 23, 2014. The entirety of the above-mentioned patent application is hereby incorporated by reference herein and made a part of this specification.

BACKGROUND OF THE INVENTION

1. Field of the Invention

The invention relates to a reader device, and more particularly, to a radio-frequency identification reader device.

2. Description of Related Art

In recent years, radio-frequency identification (RFID) techniques have been widely applied in various fields such as logistics management, automatic vehicle identification, anti-theft for retail stores, and animal monitoring. Moreover, RFID techniques mainly use a reader device to scan an RFID tag on an object so as to identify, track, and confirm the state of the object. In operation, the reader in the reader device is switched to different antennas through a plurality of switch modules, and can therefore scan an RFID tag in different region.

In general, readers in conventional reader devices use a general-purpose input/output (GPIO) interface to transmit a control signal and an operation voltage for the switch modules, and then respectively transmit the control signal and the operation voltage to each switch module through a fan-out box. Therefore, conventional reader devices generally have more complex layout structure.

SUMMARY OF THE INVENTION

An embodiment of the present invention provides a radio-frequency identification (RFID) reader device. The RFID reader device transmits an RF signal, and a direct current (DC) voltage and a control signal for a switch module through a coaxial cable. Accordingly, the complexity of the layout structure of the RFID reader device can be reduced.

The RFID reader device of the embodiment of the present invention includes a plurality of antennas, a switch module, a coaxial cable, and a reader. The switch module is electrically connected to the antennas. The coaxial cable is electrically connected to the switch module. The reader transmits a DC voltage, a control signal, and an RF signal to the switch module through the coaxial cable. The switch module generates an operation voltage by the DC voltage and the control signal. The switch module selects one of the antennas as a preset antenna by the control signal and drives the preset antenna by the RF signal.

Based on the above, the reader in the RFID reader device of the embodiment of the present invention transmits the DC voltage, the control signal, and the RF signal to the switch module through the coaxial cable. Accordingly, the layout of wires between the reader and the switch module can be simplified, thereby reducing the complexity of the layout structure of the RFID reader device.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
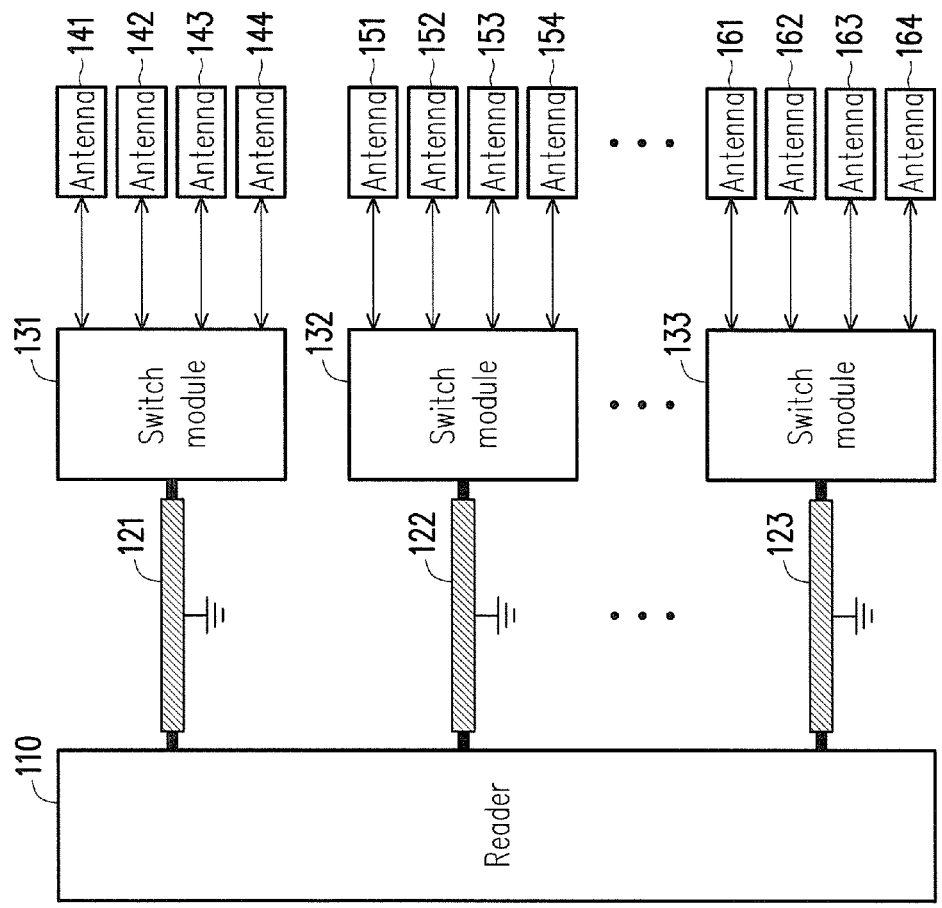
FIG. 1 is a schematic diagram of a radio-frequency identification (RFID) reader device according to an embodiment of the present invention.

FIG. 1 is a schematic diagram of a radio-frequency identification (RFID) reader device according to an embodiment of the present invention. Referring to FIG. 1, an RFID reader device 100 includes a reader 110, a plurality of coaxial cables 121-123, a plurality of switch modules 131-132, and a plurality of antennas 141-144, 151-154, and 161-164.

The switch modules 131-133 are each corresponding to an antenna group. For instance, in the embodiment of FIG. 1, each switch module is corresponding to 4 antennas. Specifically, the switch module 131 is electrically connected to the antennas 141-144, the switch module 132 is electrically connected to the antennas 151-154, and the switch module 133 is electrically connected to the antennas 161-164. Moreover, the switch modules 131-133 are each electrically connected to the reader 110 through a coaxial cable. For instance, the switch module 131 is electrically connected to the reader 110 through the coaxial cable 121, the switch module 132 is electrically connected to the reader 110 through the coaxial cable 122, and the switch module 133 is electrically connected to the reader 110 through the coaxial cable 123.

The reader 110 can control an antenna group through each switch module and can scan an RFID tag in different region by different antenna group. For instance, the reader 110 can transmit a direct current (DC) voltage, a control signal, and an RF signal to the switch module 131 through the coaxial cable 121. Moreover, the switch module 131 generates an operation voltage by the DC voltage and the control signal. Moreover, the switch module 131 selects one of the antennas 141-144 as a preset antenna by the control signal and drives the preset antenna by the RF signal to emit a corresponding electromagnetic wave. Accordingly, the RFID reader device 100 can scan an RFID tag through the electromagnetic wave emitted by the preset antenna. Moreover, the antennas 141-144 cover a preset range and the antennas 141-144 can be set as the preset antenna one by one through the switch module 131. Therefore, the RFID reader device 100 can scan an RFID tag in a preset region through the antenna group (i.e., antennas 141-144) controlled by the switch module 131.

Similarly, the RFID reader device 100 can also scan an RFID tag in another preset region through the antenna group (i.e., antennas 151-154) controlled by the switch module 132. Specifically, in addition to transmitting the RF signal to the switch module 132 through the coaxial cable 122, the reader 110 also transmits the DC voltage and the control signal for the switch module 132 through the coaxial cable 122. Moreover, the switch module 132 generates an operation voltage by the DC voltage and the control signal transmitted by the coaxial cable 122. Moreover, the switch module 132 further selects one of the antennas 151-154 as a preset antenna by the control signal transmitted by the coaxial cable 122, such that the RFID reader device 100 can scan an RFID tag in another preset region. Similarly, the RFID reader device 100 can also scan an RFID tag in another preset region through the antenna group (i.e., antennas 161-164) controlled by the switch module 133.

It should be mentioned that, the RFID reader device 100 transmits the DC voltage and the control signal for each switch module by a coaxial cable. That is, in addition to transmitting the RF signal used to drive the antennas, the coaxial cable further transmits the DC voltage and the control signal for the switch module. Accordingly, the signals (such as DC voltage, control signal, and RF signal) between the reader 110 and each switch module can be transmitted through the coaxial cable. In this way, the layout of wires between the reader 110 and each switch module can be simplified, thereby significantly reducing the complexity of the layout structure of the RFID reader device 100. Moreover, in comparison to conventional techniques, a general-purpose input/output (GPIO) interface control chip and a fan-out box are not needed for the RFID reader device 100. As a result, hardware costs of the RFID reader device 100 can be reduced. To allow those having ordinary skill in the art to better understand the invention, the detailed structure of the RFID reader device 100 is further described below.

Figure 2:
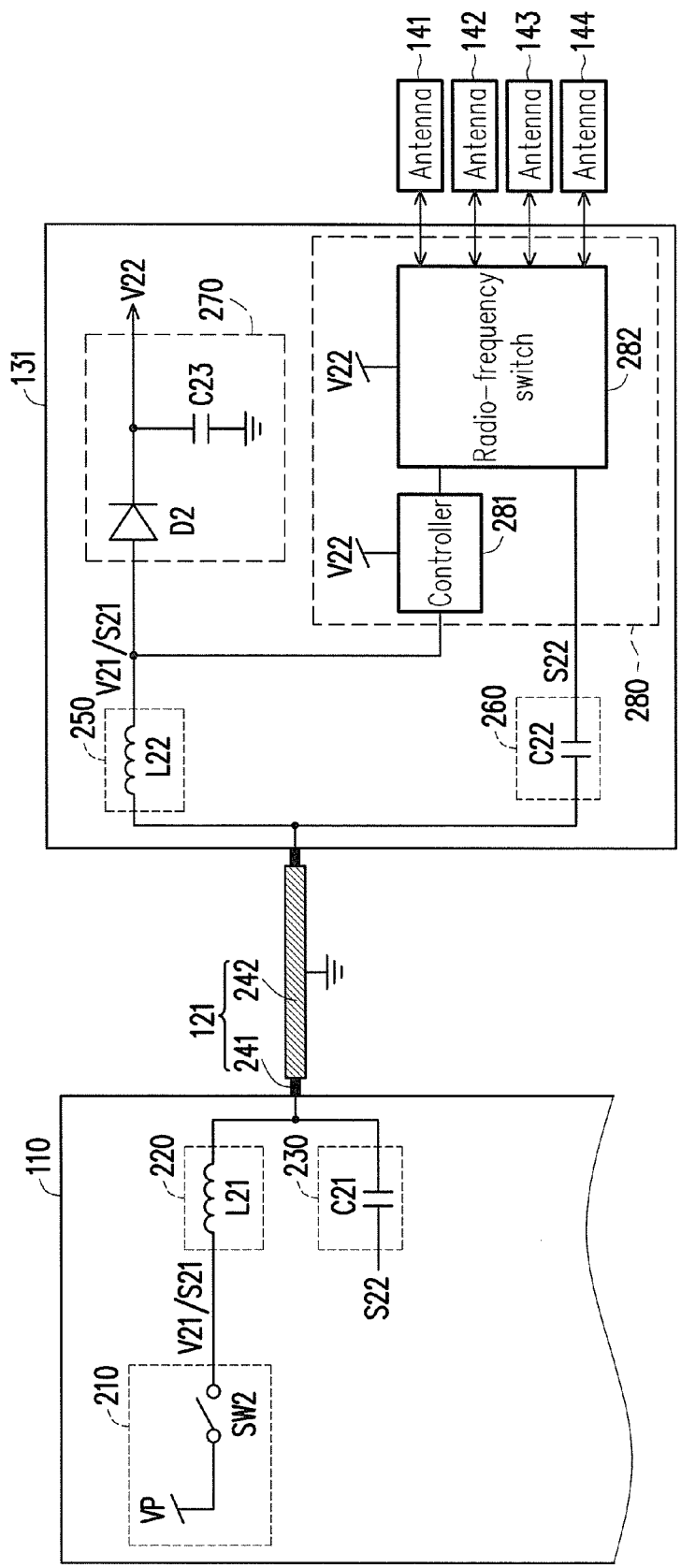
FIG. 2 is a schematic diagram of a portion of an RFID reader device according to an embodiment of the present invention.

FIG. 2 is a schematic diagram of a portion of an RFID reader device according to an embodiment of the present invention. Referring to FIG. 2, the reader 110 includes a signal generating circuit 210, a high-frequency blocking element 220, and a low-frequency blocking element 230. The signal generating circuit 210 generates a DC voltage V21 and a control signal S21. For instance, the signal generating circuit 210 includes a switch SW2, and a terminal of the switch SW2 receives a power voltage VP. In operation, the signal generating circuit 210 can control the state of the switch SW2 and thereby generate the DC voltage V21 and the control signal S21.

For instance, in a first period, the signal generating circuit 210 turns on the switch SW2. Namely, the switch SW2 is maintained at a turned-on state. Accordingly, the switch SW2 can continuously output the power voltage VP as the DC voltage V21. Moreover, in a second period, the signal generating circuit 210 switches the state of the switch SW2. Namely, the switch SW2 is switched between a turned-on state and a turned-off state. Accordingly, the switch SW2 can output a plurality of pulses to form the control signal S21.

The high-frequency blocking element 220 is electrically connected between the signal generating circuit 210 and the coaxial cable 121, and the low-frequency blocking element 230 is electrically connected to the coaxial cable 121. It should be mentioned that, the DC voltage V21 and the control signal S21 are low-frequency signals, and an RF signal S22 used to drive the antennas is a high-frequency signal. Moreover, the high-frequency blocking element 220 is used to block high-frequency signals, and the low-frequency blocking element 230 is used to block low-frequency signals.

In other words, the high-frequency blocking element 220 can block the RF signal S22 to prevent the RF signal S22 from being transmitted to the signal generating circuit 210. Moreover, the high-frequency blocking element 220 can allow transmission of the DC voltage V21 and the control signal S21, such that the DC voltage V21 and the control signal S21 are transmitted to the coaxial cable 121. Moreover, the low-frequency blocking element 230 can block the DC voltage V21 and the control signal S21 and allow transmission of the RF signal S22. Accordingly, the RF signal S22 can be transmitted to the coaxial cable 121 through the low-frequency blocking element 230.

More specifically, the high-frequency blocking element 220 can be, for instance, an inductor L21, and the low-frequency blocking element 230 can be, for instance, a capacitor C21. For instance, the impedance of the inductor L21 is directly proportional to the frequency of the signal. Therefore, for high-frequency signals (such as RF signal S22), the inductor L21 is substantially open-circuit, thus blocking the transmission of the high-frequency signals. In contrast, for low-frequency signals (such as DC voltage V21 and control signal S21), the inductor L21 is substantially short-circuit, thus allowing transmission of the low-frequency signals. Conversely, the impedance of the capacitor C21 is inversely proportional to the frequency of the signal. Therefore, the capacitor C21 can block low-frequency signals and can transmit high-frequency signals. Moreover, the inductor L21 can be, for instance, an RF choke.

Moreover, the coaxial cable 121 includes an inner conductor 241 and an outer conductor 242. The switch module 131 includes a high-frequency blocking element 250, a low-frequency blocking element 260, a converting circuit 270, and a switching circuit 280. In particular, the first terminal of the inner conductor 241 of the coaxial cable 121 is electrically connected to the high-frequency blocking element 220 and the low-frequency blocking element 230 in the reader 110, and the second terminal of the inner conductor 241 of the coaxial cable 121 is electrically connected to the high-frequency blocking element 250 and the low-frequency blocking element 260 in the switch module 131. Moreover, the outer conductor 242 of the coaxial cable 121 is electrically connected to the ground terminal.

Moreover, the operation of the high-frequency blocking element 250 and the low-frequency blocking element 260 in the switch module 131 is similar to the operation of the high-frequency blocking element 220 and the low-frequency blocking element 230 in the reader 110. Specifically, the high-frequency blocking element 250 can block the RF signal S22 and transmit the DC voltage V21 and the control signal S21 to the converting circuit 270 and the switching circuit 280. Moreover, the low-frequency blocking element 260 can block the DC voltage V21 and the control signal S21 and transmit the RF signal S22 to the switching circuit 280. Moreover, the high-frequency blocking element 250 can be, for instance, an inductor L22, and the inductor L22 can be, for instance, an RF choke. Moreover, the low-frequency blocking element 260 can be, for instance, a capacitor C22.

The converting circuit 270 converts the DC voltage V21 and the control signal S21 from the high-frequency blocking element 250 into an operation voltage V22. For instance, the converting circuit 270 includes a diode D2 and a capacitor C23. In particular, the anode of the diode D2 is electrically connected to the high-frequency blocking element 250, and the cathode of the diode D2 outputs the operation voltage V22. Moreover, the first terminal of the capacitor C23 is electrically connected to the cathode of the diode D2, and the second terminal of the capacitor C23 is electrically connected to the ground terminal. In operation, when the DC voltage V21 is received, the diode D2 is turned on, such that the capacitor C23 can be charged to the operation voltage V22. Moreover, when the control signal S21 is received, the diode D2 is still turned on in response to the pulses in the control signal S21, such that the capacitor C23 can continuously supply the operation voltage V22.

Moreover, the operation voltage V22 is transmitted to the switching circuit 280, such that the switching circuit 280 can be operated at the operation voltage V22. Moreover, the switching circuit 280 generates a plurality of digital signals according to the control signal S21 from the high-frequency blocking element 250, and the switching circuit 280 transmits the RF signal S22 from the low-frequency blocking element 260 to the preset antenna (i.e., one of antennas 141-144) according to the plurality of digital signals. Accordingly, the reader 110 can scan an RFID tag through the electromagnetic wave emitted by the preset antenna.

In the embodiment of FIG. 2, the switching circuit 280 includes a controller 281 and an RF switch 282. In particular, the controller 281 is electrically connected to the high-frequency blocking element 250, and the RF switch 282 is electrically connected to the controller 281 and the low-frequency blocking element 260. Moreover, the controller 281 and the RF switch 282 are operated at the operation voltage V22. Moreover, the controller 281 generates the plurality of digital signals according to the control signal S21, and the RF switch 282 transmits the RF signal to the preset antenna (i.e., one of antennas 141-144) according to the plurality of digital signals.

Figure 3:
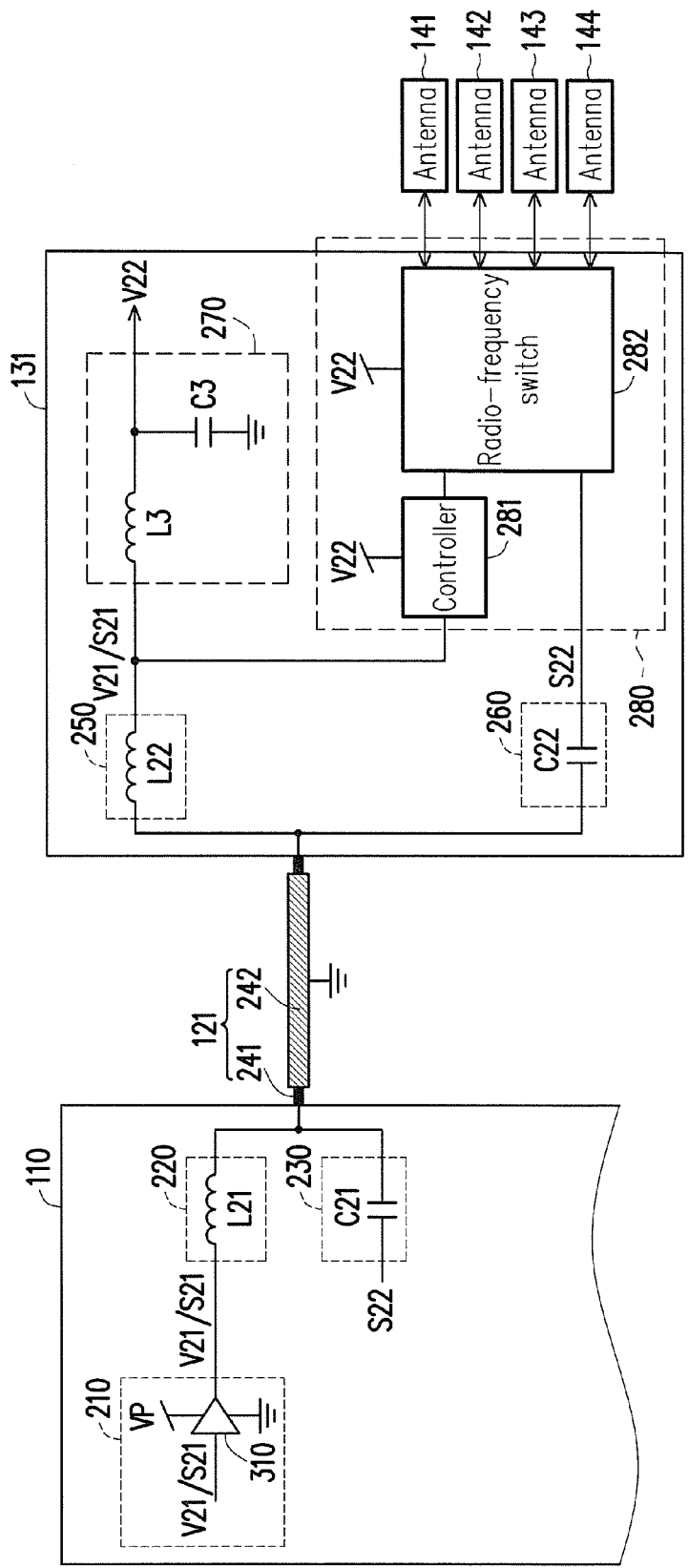
FIG. 3 is a schematic diagram of a portion of an RFID reader device according to another embodiment of the present invention.

Although implementations of the signal generating circuit 210 and the converting circuit 270 are listed in the embodiment of FIG. 2, the implementations are not intended to limit the invention. For instance, FIG. 3 is a schematic diagram of a portion of an RFID reader device according to another embodiment of the present invention. In the embodiment of FIG. 3, the signal generating circuit 210 includes a buffer 310. In particular, the buffer 310 is operated at the power voltage VP. Moreover, in the first period, the signal generating circuit 210 can output the DC voltage V21 through the buffer 310. In the second period, the signal generating circuit 210 can output the control signal S21 through the buffer 310.

Moreover, in the embodiment of FIG. 3, the converting circuit 270 includes an inductor L3 and a capacitor C3. In particular, the first terminal of the inductor L3 is electrically connected to the high-frequency blocking element 250, and the second terminal of the inductor L3 outputs the operation voltage V22. Moreover, the first terminal of the capacitor C3 is electrically connected to the second terminal of the inductor L3, and the second terminal of the capacitor C3 is electrically connected to the ground terminal. In operation, the inductor L3 can generate a stable current in response to the DC voltage V21 and the control signal S21, thereby allowing the capacitor C3 to be charged to the operation voltage V22. Moreover, the inductor L3 can be, for instance, a power choke.

Figure 4:
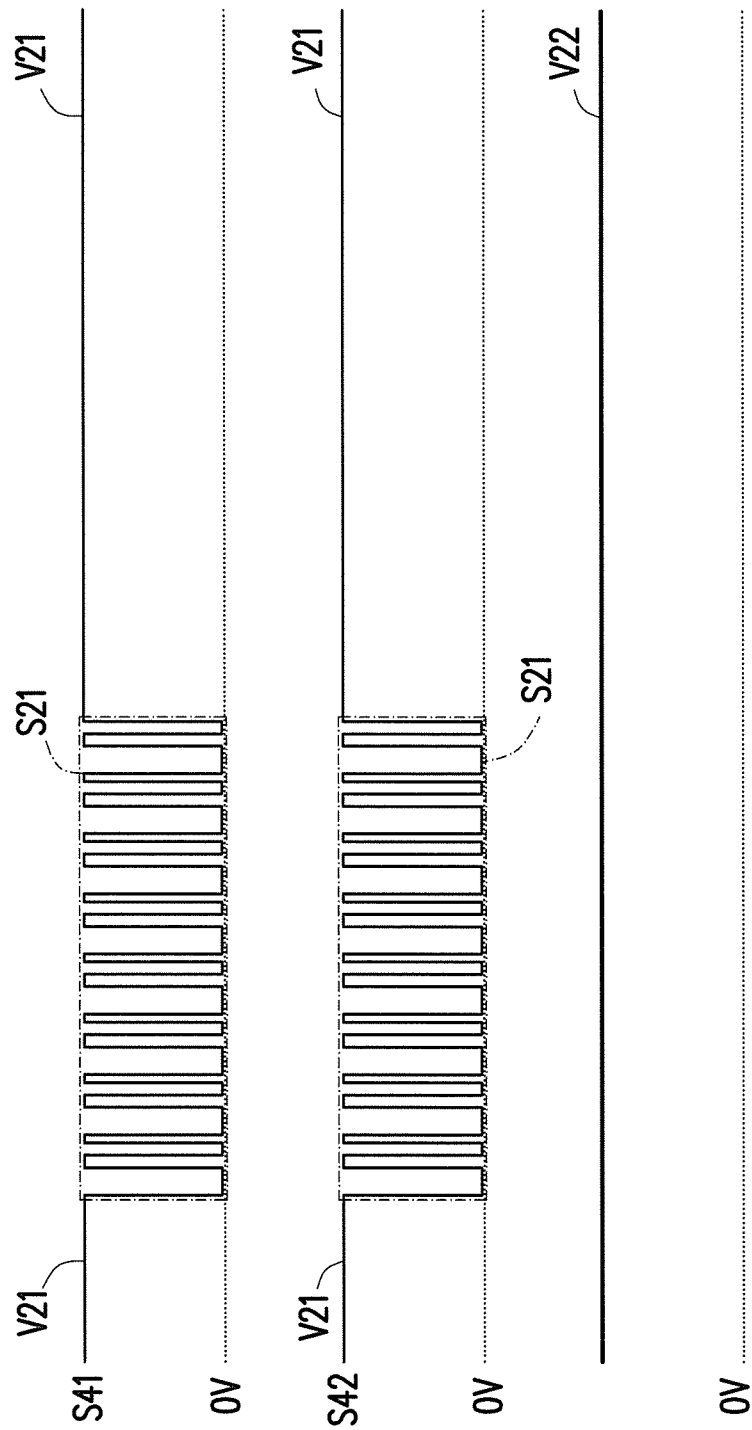
FIG. 4 is a schematic diagram illustrating signals of an RFID reader device according to an embodiment of the present invention.

It should be mentioned that, the signal generating circuit 210 in the reader 110 serially outputs the DC voltage V21 and the control signal S21, and the DC voltage V21 and the control signal S21 are outputted serially to the converting circuit 270 in the switch module 131. Therefore, in terms of transmission timing of the signals, the DC voltage V21 and the control signal S21 are substantially the same voltage signal. For instance, FIG. 4 is a schematic diagram illustrating signals of an RFID reader device according to an embodiment of the present invention. As shown in FIG. 4, a signal S41 outputted by the signal generating circuit 210 includes the DC voltage V21 and the control signal S21, and a signal S42 received by the converting circuit 270 also includes the DC voltage V21 and the control signal S21. Moreover, the converting circuit 270 can convert the DC voltage V21 and the control signal S21 into a stable operation voltage V22.

Based on the above, the reader in the RFID reader device of the invention transmits the DC voltage, the control signal, and the RF signal to the switch module through the coaxial cable. Accordingly, the layout of wires between the reader and the switch module can be simplified, thereby significantly reducing the complexity of the layout structure of the RFID reader device. Moreover, in comparison to conventional techniques, a GPIO interface controller chip and a fan-out box are not needed for the invention. As a result, hardware costs of the RFID reader device can be reduced.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A radio-frequency identification reader device, comprising:
   a plurality of antennas;
   a switch module electrically connected to the antennas;
   a coaxial cable electrically connected to the switch module, wherein the coaxial cable comprises an inner conductor and an outer conductor, and the outer conductor is electrically connected to a ground terminal; and
   a reader transmitting a direct current voltage, a control signal, and a radio-frequency signal to the switch module through the coaxial cable, wherein the switch module generates an operation voltage by the direct current voltage and the control signal, the switch module selects one of the antennas as a preset antenna by the control signal and drives the preset antenna by the radio-frequency signal, and the reader comprises:
      a signal generating circuit generating the direct current voltage and the control signal;
      a first high-frequency blocking element electrically connected to the signal generating circuit and the inner conductor, wherein the first high-frequency blocking element transmits the direct current voltage and the control signal and blocks the radio-frequency signal; and
      a first low-frequency blocking element electrically connected to the inner conductor, wherein the first low-frequency blocking element transmits the radio-frequency signal and blocks the direct current voltage and the control signal.

2. The radio-frequency identification reader device of claim 1, wherein the first high-frequency blocking element is an inductor and the first low-frequency blocking element is a capacitor.

3. The radio-frequency identification reader device of claim 1, wherein the signal generating circuit comprises a switch, the switch receives a power voltage, the switch is turned on and continuously outputs the power voltage as the direct current voltage in a first period, and in a second period, the signal generating circuit switches a state of the switch such that the switch outputs a plurality of pulses configured to form the control signal.

4. The radio-frequency identification reader device of claim 1, wherein the signal generating circuit comprises a buffer, the signal generating circuit outputs the direct current voltage through the buffer in a first period, and the signal generating circuit outputs the control signal through the buffer in a second period.

5. The radio-frequency identification reader device of claim 1, wherein the switch module comprises:
   a second high-frequency blocking element electrically connected to the inner conductor, wherein the second high-frequency blocking element transmits the direct current voltage and the control signal and blocks the radio-frequency signal;

a second low-frequency blocking element electrically connected to the inner conductor, wherein the second low-frequency blocking element transmits the radio-frequency signal and blocks the direct current voltage and the control signal;

a converting circuit converting the direct current voltage and the control signal from the second high-frequency blocking element into the operation voltage; and a switching circuit operated at the operation voltage, wherein the switching circuit generates a plurality of digital signals according to the control signal from the second high-frequency blocking element, and transmits the radio-frequency signal from the second low-frequency blocking element to the preset antenna according to the digital signals.

6. The radio-frequency identification reader device of claim 5, wherein the second high-frequency blocking element is an inductor and the second low-frequency blocking element is a capacitor.

7. The radio-frequency identification reader device of claim 5, wherein the converting circuit comprises:

a diode, wherein an anode of the diode is electrically connected to the second high-frequency blocking element and a cathode of the diode outputs the operation voltage; and a capacitor, wherein a first terminal of the capacitor is electrically connected to the cathode of the diode and a second terminal of the capacitor is electrically connected to the ground terminal.

8. The radio-frequency identification reader device of claim 5, wherein the converting circuit comprises:

an inductor, wherein a first terminal of the inductor is electrically connected to the second high-frequency blocking element and a second terminal of the inductor outputs the operation voltage; and a capacitor, wherein a first terminal of the capacitor is electrically connected to the second terminal of the inductor and a second terminal of the capacitor is electrically connected to the ground terminal.

9. The radio-frequency identification reader device of claim 5, wherein the switching circuit comprises:

a controller electrically connected to the second high-frequency blocking element and operated at the operation voltage, wherein the controller generates the digital signals according to the control signal; and a radio-frequency switch electrically connected to the controller and the second low-frequency blocking element and transmitting the radio-frequency signal to the preset antenna according to the digital signals.

* * * * *